June 25, 1957   B. J. CRAIG   2,796,755
COMBINED VEHICLE LOCK AND DOOR CONTROL
Filed Nov. 14, 1955
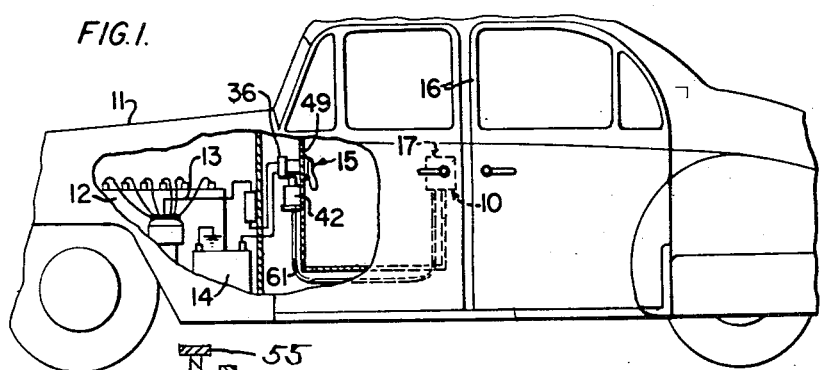
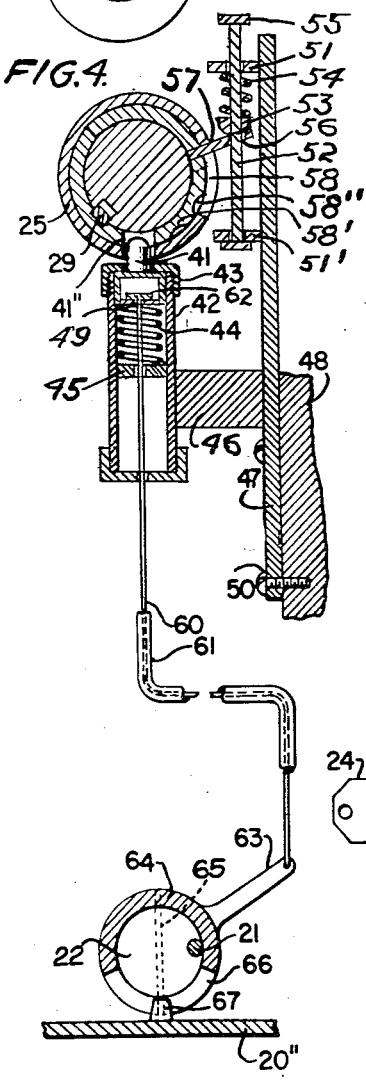
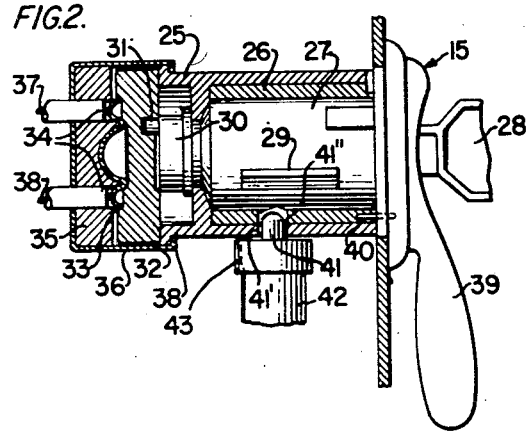
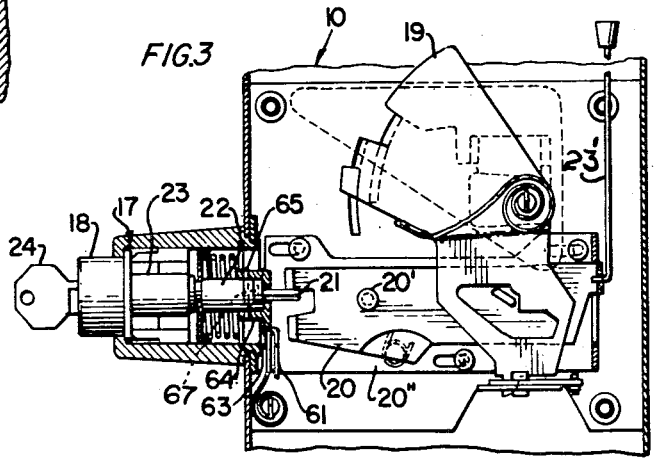
Inventor
B. J. Craig

United States Patent Office 2,796,755
Patented June 25, 1957

2,796,755

COMBINED VEHICLE LOCK AND DOOR CONTROL

Burnie J. Craig, Pasadena, Calif.

Application November 14, 1955, Serial No. 546,360

4 Claims. (Cl. 70—264)

This invention relates to a combined vehicle door lock and engine control.

In operating an automobile the person driving will first unlock one of the doors of the vehicle by means of a key. He will then remove the key from the door, enter the vehicle with the key in his hand, insert the key in the ignition lock and will turn on the ignition switch. He will then start the engine and operate the vehicle. At his destination he will turn off the ignition switch, remove the key from the ignition lock and place it in his pocket. Sometimes he will forget to remove the key from the lock and the vehicle may be stolen. It is a source of annoyance that the driver must twice move locks to unlocked position and must twice remove a key from a lock in operating a vehicle through a cycle.

The present invention overcomes the objections mentioned by providing means whereby only one unlocking of a vehicle lock is required, and provides means whereby the unlocking of a secret door lock as by a key will render the ignition switch of the vehicle operative to cause the engine to operate without unlocking the ignition switch lock.

More specifically, the present invention provides a construction wherein the unlocking of the vehicle door by secret means will condition the engine so that it may be operated and wherein should the operator so condition the engine and not care to start the engine, he may render the engine ineffective for operation.

In other words, the invention provides means whereby the operator of a vehicle may simply remove the key from his pocket, unlock the door, replace the key in his pocket, enter the vehicle, turn on the ignition and drive away. At his destination he may turn off the ignition switch without the aid of a key and may lock all the vehicle doors as by keyless locking.

Thus it will be seen that with the present invention one use of a single key in a single lock permits completion of the cycle of unlocking the vehicle door, unlocking the ignition switch, turning off the ignition switch and locking the vehicle doors.

The general object of the invention is therefore to provide an automotive vehicle which has a door and a latch for the door and has a lock for the door latch and wherein operation of the door lock controls operation of the vehicle engine.

Another object of the invention is to provide a secret unlocking means, the operation of which permits operation of the door latch to open a door and simultaneously renders the control means of an automotive vehicle engine operable to cause the engine to run.

A more specific object of the invention is to provide an automotive vehicle which includes a driving engine and a door having a lock which may be unlocked from without the vehicle by a secret lock with means whereby when the secret door lock is unlocked, the engine will be conditioned for operation.

Another object of the invention is to provide novel means for controlling the ignition circuit of a motor vehicle.

Another object of the invention is to provide novel means for controlling the ignition switch of a motor vehicle.

Another object of the invention is to provide means for rendering the ignition switch of a motor vehicle operative to start the engine when the vehicle door lock is unlocked by secret unlocking means.

A further object of the invention is to provide an improved ignition switch for a motor vehicle circuit wherein the switch may be rendered operable to close the circuit by secret lock means operable from within or without the vehicle.

Other objects and advantages of the invention will be apparent from the following description taken in connection with the accompanying drawings, wherein:

Fig. 1 is a side elevation with parts broken away showing a motor vehicle equipped with the invention;

Fig. 2 is a central sectional view showing the ignition switch;

Fig. 3 is a sectional view with parts in elevation showing the latch member; and Fig. 4 is a central sectional view showing the switch and associated parts.

Referring to the drawing by reference characters, the invention is shown as embodied in a combined vehicle door lock and engine control, which is indicated generally at 10. As shown, the construction is mounted on a vehicle 11, which is driven by an engine 12. The engine includes an ignition circuit 13, which includes a battery 14 and a switch or operating member 15 and the construction, except for switch details, to be later described, is conventional.

The body is provided with doors 16 which have latches 17 operated by push buttons 18 to release bolts 19. The latch device shown includes a pivoted locking member 20 pivoted at 20' on a reciprocating member 20'' and which is moved about its pivot 20' from locked to unlocked position by engagement with a stem 21 eccentrically arranged on a core 22 disposed within a lock barrel 23 which is carried by the push button 18. A member 23' disposed within the vehicle and connected to the pivoted locking member 20 may be employed to move the locking member to and from locked position. A secret locking member shown as a key 24, when turned, moves the core 22 and causes the stem 21 to move the locking member 20 to and from unlocked position and vice versa to thus render the push button 18 operable or inoperable to release the bolt 19.

The particular type of latch construction shown is more fully disclosed in applicant's prior application Serial No. 336,844, filed Feb. 13, 1953, Patent No. 2,728,214, granted December 27, 1955. The showing of the latch details is for the purpose of disclosing one type of latch with which the present invention may be used. The present invention is usable with any type of latch wherein an outside secretly operated lock member is provided.

In the disclosure the ignition switch shown in Fig. 2 includes a housing 25 in which a lock body 26 may rotate between certain angular limits. Within the lock body 26 a core 27 is free to rotate between limits when a key 28 has moved a dog device 29 from engagement with the body 26. The core 27, lock body 26, and dog 29 are conventional construction. The keys 24 and 28 are identical and one key serves to operate both locks.

The core 27 includes a projecting portion 30 which has an eccentric pin 31 thereon. The pin 31 rotates a disc 32 which carries a circuit closing member 33 into and out of engagement with contacts 34, which are arranged in a disc 35. The discs 32 and 35 are held on the housing 25 by a cap 36. The contacts 34 are connected to leads 37 and 38 of the ignition circuit previously mentioned. An arm 39 is connected to the body 26 by a pin 40 so that the body 26 may, after it has been freed to rotate, as will be presently described, be turned by the arm 39.

In order to normally to prevent rotation of the body 26 in housing 25, a plunger 41 is provided. The plunger 41 which serves as a releasable holding member has a rounded end passes through a slot 41′ in the housing 25 and enters a slot 41″ in the body 26. The plunger is mounted in a sleeve 42 which has a cap 43 thereon through which the plunger extends. A spring 44 normally urges the plunger 41 to engaged position. One end of the spring 44 engages the end of the plunger body and the other end of the spring engages an abutment member 45 secured within the sleeve 42.

The sleeve 42 is supported by an arm 46 which is secured by a bracket 47. The bracket 47 is secured on a support 48 by securing means 50.

The body of the plunger 41 is hollow and the lower end has a hole 49 therein through which a traction wire or actuating member 60 of a Bowden wire 61 slides. A head 62 on the end of the wire member 60 engages the inner surface of the plunger 41.

The bracket 47 supports a pair of upper and lower guides 51 and 51′ through which a slide member 52 extends. The slide member has a collar 53 fixed thereon which is engaged by one end of a spring 54, the other end of the spring 54 engages the upper guide 51 to normally urge the slide downwardly in Fig. 4. A head 55 on the guide limits movement of the guide by the spring 54.

The slide 52 passes loosely through a slot 56 on an arm 57. The arm 57 is secured on the lock body 26. The arm 57 moves in a slot 58 in the housing 25. The lock body 26 has spaced indentations 58′ and 58″ which selectively receive the rounded end of the plunger 41 to thereby hold the lock body in its "off" and "on" positions.

The Bowden wire 60 is connected to a crank arm 63 on a sleeve 64 which is secured on the core member 22 by a pin 65. The sleeve 64 is cut away at 66 for a portion of its length to avoid engaging a tongue 67 on the sliding member 20″.

When a key 24 is inserted in the member 18 and turned the core 22 will be rotated thus causing the sleeve 64 to be rotated clockwise in Fig. 4, thus rocking the crank arm 63 and pulling the wire downwardly. This will cause the plunger 41 to be moved downwardly against the tension of the spring 44. This action will cause the end of the plunger 41 to move out of the slot 41″ in the lock body 26 so that the lock body 26 is free to rotate.

As soon as the lock body 26 is free the compression spring 54 will rock the arm 57 downwardly in Fig. 4 until the head 55 on the slide member 52 engages the upper guide 51. In this position the indentation 58′ will be aligned with the plunger 41 and the plunger end will then enter the indentation 58′ and the plunger will be urged into engagement by the spring 44 so that the lock body will be releasably held against rotation.

When the parts are positioned as thus described, that is with the plunger in the indentation 58′, the circuit closer 33 will be in the "off" position. From this "off" position the lock body can be moved by the member 39 either anti-clockwise back to the position shown in Fig. 4 to the circuit closer "off" position where it will be locked by the plunger 41 entering the slot 41″. Or, the lock body 26 may be rotated clockwise to a position where the plunger enters the indentation 58″ and is held in this latter position in which the circuit closer 33 is in "on" position.

In operation, when the ignition switch is off and is locked and the vehicle door is locked, the operator will insert the key 24 and will rotate the key to thus cause the plunger 41 to be withdrawn from the slot 41″. The spring 54 will then be free to move the lock body 26 until the plunger is opposite the indentation 58′.

As soon as the door lock is unlocked the key 24 is returned to normal position before it is withdrawn and this restores the crank arm 63 to the position in Fig. 4 so that the plunger is free to be pushed by the spring 44 into the indentation 58′.

If the operator then wishes to operate the vehicle he will move the member 39 clockwise so that the indentation 58″ receives the plunger 41 whereupon the plunger 41 will hold the lock member 26 and the ignition switch will be in "on" position. If on the other hand the operator does not care to operate the vehicle the plunger 41 may remain in the indentation 58′ or the operator may turn the member 39 anti-clockwise to bring the plunger 41 opposite the slot 41″ to restore the parts to ignition locked position.

Should the vehicle door be unlocked when the operator is ready to operate the vehicle, the operator may insert the key 28 directly into the ignition switch lock and may then turn the key to move the circuit closer 33 to "on" position.

When the key 28 is in the ignition lock core 27 the circuit closer 33 may be moved to "on" and "off" position whenever desired by turning the key and the switch may be locked in "off" position by removing the key.

When the circuit closer 33 has been conditioned by the act of unlocking the door lock, so that the plunger 41 is in the indentation 58′, the circuit closer may be moved by the member 39 to "on" or to "off" position at will, as desired. Also, the circuit closer may be placed in locked position by moving the member 39 so that the plunger 41 may enter the slot 41″.

Having thus described the invention, I claim:

1. A motor vehicle having an ignition circuit controlled internal combustion engine and a lock controlled switch for the ignition circuit and which has a body provided with a door and has a secret locking member for the door, said ignition switch lock having a locked "off" position, an unlocked "off" position and an "on" position, and a releasable holding member releasably holding the switch when it is in the unlocked "off" position, in combination with means including a member interconnecting the door locking member and the ignition switch lock and actuated by movement of the door locking member to unlocked position to release the ignition switch lock.

2. A motor vehicle having an ignition circuit controlled internal combustion engine and a lock controlled switch for the ignition circuit and which has a body provided with a door and has a secret locking member for the door, in combination with means including a member interconnecting the door locking member and the ignition switch lock and actuated by movement of the door locking member to unlocked position to release the ignition switch lock, said ignition switch lock having a locked "off" position, an unlocked "off" position and an "on" position, a releasable holding member releasably holding the switch when it is in the unlocked "off" position, and a switch moving member operable when the door locking member has been moved to unlocked position and has released the ignition switch lock to move the switch from locked "off" position to unlocked "off" position.

3. A motor vehicle having a driving engine and a lock controlled operating member for the engine and which has a body provided with a door and has a secret locking member for the door, said operating member lock having a locked "off" position, an unlocked "off" position and an "on" position, means normally urging the operating member from the locked "off" position to the unlocked "off" position, a releasable holding member releasably holding the operating member in the unlocked "off" position, in combination with means including a member interconnecting the door locking member and the engine controlling member and operable upon movement of the door lock to unlocked position to free the operating member for movement by said urging means toward the unlocked "off" position.

4. A motor vehicle having an ignition circuit controlled internal combustion engine and a lock controlled switch for the ignition circuit and which has a body provided with a door and has a secret locking member for the door, said ignition switch lock having a locked "off" position, an unlocked "off" position and an "on" position, means normally urging the switch from the locked "off" position to the unlocked "off" position, a releasable holding member releasably holding the switch in either the unlocked "off" position or in the "on" position, in combination with means including a member interconnecting the door locking member and the ignition switch lock and operable upon movement of the door lock to unlocked position to free the switch for movement by said urging meaans to the unlocked "off" position.

References Cited in the file of this patent
UNITED STATES PATENTS

| | | |
|---|---|---|
| 1,774,259 | Fairchild | Aug. 26, 1930 |
| 2,726,535 | Craig | Dec. 13, 1955 |
| 2,726,536 | Craig | Dec. 13, 1955 |